US005458949A

United States Patent [19]

Komiyama et al.

[11] Patent Number: 5,458,949

[45] Date of Patent: Oct. 17, 1995

[54] FILM FOR HIGH HEAT-SENSITIVE STENCIL PAPER

[75] Inventors: Megumi Komiyama, Tokyo; Kazuo Endo; Masashi Tate, both of Yokohama, all of Japan

[73] Assignee: Diafoil Hoechst Company, Limited, Tokyo, Japan

[21] Appl. No.: 234,021

[22] Filed: Apr. 28, 1994

[30] Foreign Application Priority Data

Apr. 28, 1993 [JP] Japan .................................... 5-102773

[51] Int. Cl.$^6$ ............................ B32B 27/06; B32B 27/36; B32B 5/02; C08G 63/18

[52] U.S. Cl. ............................ 428/141; 428/323; 428/338; 428/339; 428/480; 428/910; 525/444; 525/448; 528/305; 528/308.6

[58] Field of Search .................................... 525/444, 437, 525/448; 528/308.6, 309.1, 308, 305, 302, 272; 428/480, 483, 331, 332, 323, 141, 328, 329, 330, 910, 338, 339

[56] References Cited

U.S. PATENT DOCUMENTS

| | | | |
|---|---|---|---|
| 4,766,033 | 8/1988 | Yoshimura et al. | 428/332 |
| 4,818,581 | 4/1989 | Katoh et al. | 428/143 |
| 4,961,377 | 10/1990 | Bando et al. | 101/128.21 |
| 5,006,589 | 4/1991 | Sakamoto et al. | 524/430 |
| 5,061,565 | 10/1991 | Aoki et al. | 428/409 |
| 5,160,564 | 11/1992 | Hasegawa et al. | 156/231 |

FOREIGN PATENT DOCUMENTS

| | | |
|---|---|---|
| 0406884A2 | 9/1991 | European Pat. Off. . |
| 0529632A1 | 3/1993 | European Pat. Off. . |
| 3-39294 | 2/1991 | Japan . |

*Primary Examiner*—Paul J. Thibodeau
*Assistant Examiner*—Vivian Chen
*Attorney, Agent, or Firm*—Foley & Lardner

[57] ABSTRACT

A film for heat-sensitive stencil paper comprising a biaxially oriented film having a thickness of 0.5 to 6.0 μm and formed from a polyester composition comprising polybutylene terephthalate and at least one other polyester, the content of the polybutylene terephthalate in the polyester composition being 20 to 80 wt %, the polyester composition has one melting point or a plurality of melting points with a difference of less than 10° C. between the highest melting point and the lowest melting point.

20 Claims, No Drawings

FILM FOR HIGH HEAT-SENSITIVE STENCIL PAPER

BACKGROUND OF THE INVENTION

The present invention relates to a film for high heat-sensitive stencil paper and, particularly, to a film for high heat-sensitive stencil paper which has an excellent perforation sensitivity and an excellent printing quality, i.e., resolution and density of a printed image.

As heat-sensitive stencil paper, a laminate of a thermoplastic resin film such as polyester film and thin porous paper is conventionally known. The film used for this purpose is required to have a high thermal perforation sensitivity. In other words, the film is required to melt with a small quantity of heat and to have an adequate heat shrinkage ratio which enables openings of an appropriate size for producing a clear printed image to be formed.

As a material of a film used for such a purpose, a mixture of polyesters is known (e.g., Japanese Patent Application Laid-Open (KOKAI) No. 3-39294 (1991)). In the film material, polymers are mixed so as to lower the melting point and to enable perforation with a small quantity of heat. However, since the melting temperatures are different between the mixed polyesters, uniform perforation is not always possible.

A copolymerized polymer may be used as a material of this type of film. In most case, however, the crystallinity is lowered due to copolymerization, and when the film is industrially produced from such a copolymer, fusion is caused while the resin is heated and dried, so that melt extrusion by a screw extruder is impossible.

As a result of various studies undertaken by the present inventors so as to solve the above-described problems, it has been found that a biaxially oriented film which is formed from at least two polyesters and has a specified thickness and melting point is suitable for heat-sensitive stencil paper. On the basis of this finding, the present invention has been achieved.

SUMMARY OF THE INVENTION

The object of the present invention is to provide a film for heat-sensitive stencil paper having a good handling property and an excellent perforation property, and showing a high resolution and an excellent printing quality when printing is conducted by using a stencil paper produced from the film.

To accomplish the aims, in an aspect of the present invention, there is provided a film for heat-sensitive stencil paper comprising a biaxially oriented film having a thickness of 0.5 to 6.0 μm and formed from a polyester composition comprising polybutylene terephthalate and at least one other polyester, > The content of the polybutylene terephthalate in the polyesters being 20 to 80 wt %, the polyester composition having one melting point or a plurality of melting points with a difference of less than 10° C. between the highest melting point and the lowest melting point, when the polyester composition is formed into the film.

DETAILED DESCRIPTION OF THE INVENTION

The "polyester" used herein means generally polymers which are produced by the polycondensation of a dicarboxylic acid, a diol or a hydroxycarboxylic acid. Examples of the dicarboxylic acid include terephthalic acid, isophthalic acid, adipic acid, azelaic acid, cebacic acid, 2,6-naphthalene dicarboxylic acid and 1,4-cyclohexanedicarboxylic acid. Examples of the diol include ethylene glycol, 1,4-butanediol, diethylene glycol, triethylene glycol, neopentyl glycol, 1,4-cyclohexane dimethanol and polyethylene glycol. Examples of the hydroxycarboxylic acid include p-hydroxybenzoic acid and 6-hydroxy-2-naphthoic acid.

Polybutylene terephthalate has high crystallinity, is easy to industrially dry, and has a lower melting point and a lower crystalline melting energy than polyethylene terephthalate or the like, so that it is easy to perforate with heat a film formed therefrom. In the present invention, therefore, a polyester composition containing polybutylene terephthalate is used. It is preferable that the polyester composition also contains polyethylene terephthalate isophthalate which has a compatibility with polybutylene terephthalate and a melting point comparatively closer to that of polybutylene terephthalate.

The polybutylene terephthalate refers to a polyester in which usually at least 70 mol %, preferably at least 80 mol % of the dicarboxyic acid component is terephthalic acid, and usually at least 75 mol %, preferably at least 80 mol % of the glycol component is 1,4-butanediol. The polyethylene terephthalate isophthalate refers to a copolymerized polyester in which usually at least 65 mol % of the dicarboxyic acid component is terephthalic acid, and at least 10 mol % the dicarboxyic acid component is isophthalic acid, and at least 70 mol % of the diol component is ethylene glycol. In addition to the polybutylene terephthalate and the polyethylene terephthalate isophthalate, the polyester composition also may contain a polyester obtained by the condensation of the above-described dicarboxyic acid, diol and hydroxycarboxylic acid.

It is necessary in the polyester composition that the content of the polybutylene terephthalate is 20 to 80 wt % preferably 40 to 70 wt % If the content of the polybutylene terephthalate is less than 20 wt %, it is difficult to obtain the shrinkage characteristic for providing a high perforation sensitivity. If the content of the polybutylene terephthalate exceeds 80 wt %, a crystallization rate tends to increase, thereby deteriorating stretch properties in the production of the film and lowering the productivity.

The thickness of the polyester film of the present invention is 0.5 to 6.0 μm, preferably 0.5 to 2.0 μm, more preferably 0.5 to 1.5 μm. As the film thickness becomes thin, the range of heat conduction is reduced and, as a result, the heat energy necessary for perforation is reduced, thereby improving the perforation property, the resolution of a printed image and the printing quality. However, if the film thickness is less than 0.5 μm, a printed image is not clear, the density is apt to be lacking in uniformity, and the printing durability is apt to be lowered. On the other hand, if the film thickness exceeds 6 μm, the perforation property tends to be deteriorated, so that a uniform printed image may not be obtained.

The polyester composition has one melting point or a plurality of melting points, when formed into a film. The melting point or points are usually from 150° to 240° C., preferably 160° to 230° C. If the melting point is higher than 240° C. it is difficult to obtain a high perforation sensitivity which is aimed at by the present invention. If the melting point is lower than 150° C. the dimensional heat resistance of the film may be lowered, and curling may occur in the process of producing stencil paper or during the preservation of the stencil paper, or a contrast of a printed image may be deteriorated.

In the present invention, the difference ($T_M-T_m$) between the highest melting point ($T_M$) and the lowest melting point ($T_m$) is less than 10° C. $T_M$ may be equal to $T_m$ (i.e, one melting point). If the temperature difference in more than 10° C., uniform perforation in a short time is difficult. When the temperature difference is less than 10° C., a mixture of polyesters can provide the same degree of perforation sensitivity as the perforation sensitivity of a copolymerized polyester which is single and has the same composition.

That is, it is important in the present invention that the melting points of the polyester film measured by DSC (differential scanning calorimetry) satisfy the following formulas (1) to (3) at the same time:

$$0 \leq T_M - T_m < 10° \text{ C.} \quad (1)$$

$$T_M \leq 240° \text{ C.} \quad (2)$$

$$T_m \leq 150° \text{ C.} \quad (3)$$

The intrinsic viscosity of the polyester composition used in the present invention is usually 0.6 to 1.2, preferably 0.7 to 1.0. If the intrinsic viscosity is less than 0.6, the strength of the film may be lowered. If the intrinsic viscosity is more than 1.2, the resin pressure at the time of melt extrusion may become so high that melt extrusion may become difficult. In addition, there is a tendency of enlarging the difference between $T_M$ and $T_m$.

It is preferable in the present invention that the heat shrinkage of the film by treatment at 100° C. for 3 minutes is not less than 20%, more preferably 30 to 80%. If the heat shrinkage of the film is less than 20% the perforation sensitivity is usually insufficient and the density of a printed image may be insufficient.

In order to improve the handling property during the wind-up step in the production of the film, during the coating and laminating steps in the production of stencil paper, and during printing, and in order to prevent the film from being stuck to the thermal head due to fusion during thermal perforation, the surface of the film is usually roughened so as to impart an appropriate slipperiness to the film. In order to roughen the surface of the film, 0.01 to 2.0 wt % of fine particles having an average particle diameter of 0.05 to 3.0 μm are ordinarily mixed with the polyester composition. Preferably, 0.1 to 1.5 wt % of particles having an average particle diameter of 0.1 to 2.0 μm are contained in the film.

Examples of the particles are those of calcium carbonate, magnesium carbonate, barium carbonate, calcium sulfate, barium sulfate, calcium phosphate, lithium phosphate, magnesium phosphate, lithium fluoride, aluminum oxide, silicon oxide, titanium oxide, kaolin, talc, zeolite, diatomaceous earth (Celite), carbon black, silicon nitride, boron nitride and crosslinked polymer particles such as those described in Japanese Patent Publication (KOKOKU) No. 59-5216 (1984), but the particles contained are not restricted to these examples The particles may be used singly or in mixture. In the case of using two or more in mixture, the average particle diameter and the total content of the particles are preferably in the abovedescribed ranges If the average particle diameter is less than 0.05 μm or the content of the particles is less than 0.01 wt % the roughness of the film surface is apt to become insufficient If the average particle diameter exceeds 3.0 μm or the content of the fine particles exceeds 2.0 wt % the roughness of the film surface becomes too large for uniform heat transfer, which leads to nonuniform perforation and inferior resolution and printing quality.

An especially preferable method of roughening the surface is a method of mixing, with the polyester composition, particles (A) having an average particle diameter ($d_1$) of 0.6 to 3.0 μm and a Mobs hardness of not less than 5 and particles (B) which have an average particle diameter ($d_2$) of 0.06 to 0.8 μm and in which $d_1/d_2$ is 2 to 10. According to this method, the particles (A) having the high Mohs hardness have a favorable effect on the measure to counter the contamination on a thermal head. Although the reason is not clear, it is deduced, from the fact that the particles having the hardness equal to or more than the hardness of the thermal head exerts a marked effect, that the particles (A) forming the protuberances on the film surface rub off the contaminant which has adhered to the thermal head and polishes the thermal head, in other words, the particles have a cleaning effect.

If the Mohs hardness of the particles (A) is less than 5, after the plate making operation is repeated multiple times, contaminant may adhere to the thermal head, so that the perforation sensitivity is sometimes lowered. If the average particle diameter of the particles (A) is less than 0.6 μm, the wind-up property may be deteriorated. On the other hand, if the average particle diameter of the particles (A) exceeds 3.0 μm, the flatness of the film surface may be insufficient for uniform heat transfer, leading to nonuniform perforation and inferior resolution and printing quality. If the average particle diameter of the particles (B) is less than 0.06 μm, the slipperiness may be insufficient, thereby sometimes lowering the operability. If the average particle diameter of the particles (B) exceeds 0.8 μm, the flatness of the film surface may be insufficient for uniform heat transfer, leading to nonuniform perforation and inferior resolution and printing quality.

When the average particle diameter ratio ($d_1/d_2$) of the average particle diameter ($d_1$) of the particles (A) and the average particle diameter ($d_2$) of the particles (B) is in the range of 2 to 10, it is possible to rapidly reduce the adhering air layer during the film wind-up operation, so that a good wind-up property can be obtained. If the average particle diameter ratio ($d_1/d_2$) exceeds 10, the surface roughness of the film may become too large for uniform heat transfer, leading to nonuniform perforation and inferior resolution and printing quality.

The preferable Mohs hardness of the particles (A) is not less than 5.5, the preferable average particle diameter ($d_1$) of the particles (A) is 0.8 to 2.0 μm, and the preferable average particle diameter ($d_2$) of the particles (B) is 0.1 to 0.6 μm.

The content of the particles (A) is preferably 0.005 to 0.3 wt %. It is preferable that the number of particles (A) in 1 g of the polyester resin is $8.85 \times 105^5$ to $1.33 \times 10^{10}$. More preferable content of the particles (A) is 0.01 to 0.2 wt % and more preferable number of particles (A) in 1 g of the polyester resin is $1.77 \times 10^6$ to $8.84 \times 10^9$. If the content and the number of particles (A) are less than 0.005 wt % and $8.85 \times 10^5$, respectively, the wind-up property of the film may be deteriorated. On the other hand, if the content and the number of particles (A) exceed 0.3 wt % and $1.33 \times 10^{10}$ respectively, the surface roughness of the film may become too large for uniform heat transfer, which may lead to nonuniform perforation and inferior resolution and printing quality.

The content of the particles (B) is 0.05 to 3 wt %. It is preferable that the number of particles (B) in 1 g of the polyester resin is $4.67 \times 10^8$ to $2.65 \times 10^{14}$. More preferable content of the particles (B) is 0.1 to 2 wt %, and more preferable number of particles (B) in 1 g of the polyester resin is $9.33 \times 10^8$ to $1.77 \times 10^{14}$. If the content and the number of particles (B) are less than 0.05 wt % and $4.67 \times 10^8$, respectively, the slipperiness may be insufficient, thereby lowering the operability. On the other hand, if the content and the number of particles (B) exceed 3 wt % and 2.65×$10^{14}$, respectively, the flatness of the film surface may be insufficient for uniform heat transfer, which may lead to nonuniform perforation and inferior resolution and printing quality.

Examples of the inert particles (A) having a Mohs hardness of not less than 5 are the particles of aluminum oxide (alumina), silicon oxide, titanium oxide, zeolite, diatomaceous earth (Celite), silicon nitride and boron nitride. Examples of the particles (B) include those of calcium carbonate, magnesium carbonate, barium carbonate, calcium sulfate, barium sulfate, calcium phosphate, lithium phosphate, magnesium phosphate, lithium fluoride, kaolin, talc, carbon black, and crosslinked polymer particles such as those described in Japanese Patent Publication (KOKOKU) No. 59-5216 (1984).

If the fused portions of the film at the time of perforation adheres to the thermal head, the perforation sensitivity is lowered. In order to prevent this and further enhance the resolution of a printing image and the printing quality, it is preferable to use fine particles having a sharp particle size distribution as the fine particles which are mixed so as to rough the film surface. The particle size distribution ($d_{25}/d_{75}$) of the fine particles measured by a later-described method is preferably 1.0 to 1.5, more preferably 1.1 to 1.3. If the particle size distribution ($d_{25}/d_{75}$) exceeds 1.5, blunt protuberances increase, so that the above-described effect may not be produced. It is the most preferable to use the one selected from the group consisting of spherical silica, synthesized calcium carbonate and monodisperse crosslinked fine particles such as those described in Japanese Patent Application Laid-Open (KOKAI) No. 2-194047 (1990).

In the present invention, the center-line average surface roughness (Ra) of the film is preferably 0.01 to 0.4 μm, because the operability of the film and the resolution and the printing quality of a printed image can be satisfied to a higher degree. The center-line average surface roughness (Ra) of the film is more preferably 0.02 to 0.3 μm. In addition, the maximum height (Rt) of the film surface is preferably 0.4 to 3 μm, more preferably 0.5 to 2 μm.

Since the film of the present invention is very thin, it is preferable that the film has tensile modulus of not less than 300 kg/mm$^2$, more preferably 350 kg/mm$^2$ in both the machine and transverse directions so as to enhance the handling operability and the printing durability.

A method of producing a polyester film of the present invention will now be explained. The polyester composition is supplied to a known melt-extruding apparatus such as an extruder so as to be heated to a temperature of not lower than the melting point of the polyester composition and melted. The molten polyester composition is extruded from a slit die, and rapidly cooled to a temperature of not higher than the glass transition temperature on a rotary cooling drum so as to be hardened. In this manner, a substantially amorphous unstretched sheet is obtained. In this case, since it is necessary to bring the sheet into as close contact as possible with the rotary cooling drum in order to improve the flatness of the sheet, an electrostatic pinning method or a liquid contact method is preferably adopted.

The electrostatic pinning method is a method of stretching a linear electrode is ordinarily provided above the upper surface of the sheet in the direction perpendicular to the flow of the sheet, and applying a direct voltage of about 5 to 10 kV to the linear electrode so as to apply electrostatic charges to the sheet, thereby bringing the sheet into closer contact with the drum. The liquid contact method is a method of uniformly applying a liquid to the whole part or a part (e.g., only the parts which come into contact with both edge portions of the sheet) of the surface of the rotary cooling drum, thereby bringing the sheet into closer contact with the drum. Both methods may be adopted in the present invention, if necessary.

In the present invention, the sheet obtained in this manner is biaxially stretched so as to form a film. The amorphous sheet is first stretched in one direction by a roll or tenter type stretching machine at a temperature of ordinarily 20° to 100° C., preferably 25° to 80° C., to ordinarily 3.0 to 7 times, preferably 3.5 to 7 times. Thereafter, the film is stretched by a tenter type stretching machine in the direction perpendicular to the direction of stretch at the first stage at a temperature of ordinarily 20° to 100° C., preferably 25° to 90° C. ordinarily 3.0 to 7 times, preferably 3.5 to 7 times, more preferably 4.0 to 7 times, thereby obtaining a biaxially oriented film. A method of stretching the film in one direction at two stages may be adopted. In this case, the total stretch ratio is preferably in the above-described range. It is also possible to stretch the film simultaneously biaxially so that the stretch area ratio is 10 to 40. The film obtained may be subjected to a treatments such as heat treatment and aging, if necessary. Before or after the heat treatment or aging, the film may be restretched in the machine and/or transverse directions.

The film obtained in the above-described manner is laminated with predetermined thin porous paper by an adhesive to produce heat-sensitive stencil paper. The heat-sensitive stencil paper obtained in this manner has an excellent perforation sensitivity and is excellent in resolution and gradation of a printed image.

EXAMPLES

The present invention will be explained in more detail while referring to the following non-limitative examples. The evaluation and measurement of the properties were made in the following methods. "Part" in examples and comparative examples means "part by weight".

(1) Film thickness

The film thickness was measured by using a thickness gauge Mumetron, produced by Citizen Watch Co., Ltd.

(2) Melting point

The melting point was measured by using a differential scanning calorimeter SSC580DSC model 20 (produced by Seiko Instruments and Electronics, Ltd. ) under the following condition. 10 mg of a sample film was set in a DSC apparatus, and the temperature was raised at a rate of 10° C./min. The measurement was conducted in the range of 0° to 300° C., and the melting heat absorption peak was measured as the melting point.

(3) Intrinsic viscosity 1 g of the polymer was dissolved in 100 ml of a mixed solvent of phenol and tetrachloroethane in a weight ratio of 50:50, and the intrinsic viscosity was measured at 30° C. by using an Ubbellohde viscometer.

(4) Average heat shrinkage in machine and transverse directions

A sample was heat-treated in a non-tensioned state for 3 minutes in an oven which was held at 100° C. By measuring the lengths of the sample before and after the heat treatment, a heat shrinkage was calculated from the following formula:

$$\text{Heat shrinkage } (\%) = \frac{(Hb - Ha)}{Hb} \times 100$$

where in:

Ha: the length of the sample after heat treatment

Hb: the length of the sample before heat treatment

The heat shrinkages of 5 samples were measured in both the machine and transverse directions, and the average value was obtained.

(5) Average particle diameter of particles

The particle diameters were measured by a sedimentation method in accordance with the Stokes' law of resistance by using a particle size distribution measuring machine SA-CP3 (trade name: produced by Shimadzu Seisakusho Ltd.) by centrifugal sedimentation. The average particle diameter ($dS_{50}$) was calculated as the diameter at the point of 50 wt % of the total accumulated value obtained by adding the measured values of all particles to each other in order of size as an equivalent sphere. Similarly, the particle diameter of the particles at the points of 25 wt % and 75 wt % were expressed as $d_{25}$ and $d_{75}$, respectively.

(6) Center-line average surface roughness (Ra)

The center line average roughness was measured in the following way by using a surface roughness apparatus SE-3F, produced by Kosaka Kenkyusho K.K. From the profile curve of the film, a portion of a reference length of L (2.5 mm) was sampled in the direction of the center line. On the portion is the axis X, the machine direction is the axis Y, and the roughness curve is represented by y=f(x) , the surface roughness (μm) was obtained from the following formula:

$$Ra = (1/L) \int_0^L |f(x)| dx$$

10 profile curves of the film were obtained from the surface of the sample film, and the center-line average surface roughnesses of the film was expressed by the average value of the center-line average surface roughnesses of the sampled portions. The radius of the tip of the probe was 2 μm, the load was 30 mg, and a cut off value was 0.08 mm.

(7) Maximum height (Rt) of film surface

The sampled portion of the profile curve of the film obtained at the time of measuring the center-line average surface roughness was sandwiched between two straight lines which are parallel to the center line of the sampled portion. The interval between the two straight lines was measured in the direction of the axial magnification of the film. This value (μm) was expressed as the maximum height of the sampled portion. 10 profile curves of the film were obtained from the surface of the sample film, and the maximum height of the film surface was expressed by the average value of the maximum height of the sampled portions.

(8) Wind-up property 6000 m of the film produced at a line speed of about 170 m/min was wound up around a paper tube of 15 cm in diameter. The edge of the film was observed and the evaluation was divided into the following four ranks.

o: The edge surface was even.

O: The edge surface was approximately even. Allowable in practical use.

Δ: Part of the edge surface was uneven.

X: The edge surface was almost uneven.

(9) Practical properties of heat-sensitive stencil paper The film was laminated with Japanese paper (washi) to produce heat-sensitive stencil paper. The heat-sensitive stencil paper was made into a stencil for letters and an image having a 12-staged gradation by using a thermal head while applying energies of 0.09 mJ and 0.12 mJ. The perforated state of the gradated image portion was observed through a microscope from the film side of the stencil paper which was made into the stencil to evaluate the perforation sensitivity.

(i) Perforation sensitivity.

O: Predetermined perforation was accurately performed. The openings were adequately large.

Δ: On rare occasions, predetermined perforation was not performed at some points, and some of the openings had an insufficient size.

x: There were many portions at which predetermined perforation was not performed. The size of the openings was insufficient. Practical application was difficult.

The film is required to have a printing quality of O or Δ from the point of view of practical application.

The stencil was mounted on a RISOGRAPH printer AP7200 (produced by Riso Kagaku Kogyo K.K.) for actual printing. The letters and image obtained were visually judged with respect to the following properties.

(ii) Printing quality

O: Clearly printed without producing unevenness in the density or a blot.

Δ: Slight unevenness in the density and a few blots were observed. Not very clear.

x: Unevenness in the density, blots and blurs were distinctly observed. Practical application was difficult.

The film is required to have a printing quality of O or Δ from the point of view of practical application.

Example 1

Polymerization of polyester 100 parts of dimethyl terephthalate, 56 parts of 1,4-butanediol and 0.0075 part of tetrabutyl titanate were charged into a reactor. The initial reaction temperature was 150° C., and the temperature was gradually raised while distilling off methanol. The reaction temperature was raised to 210° C. in about 3 hours. After the reaction was further continued for 1 hour, a polycondensation reaction was carried out by an ordinary method. As the temperature was gradually raised, the pressure was gradually reduced from the normal pressure. 2 hours after the start of the polycondensation reaction, the temperature was 260° C. and the pressure was 0.3 mmHg. 4 hours after the start of the reaction, the reaction was stopped and the polymer was drawn out under pressurization with nitrogen. The intrinsic viscosity of the polyester (A) obtained was 0.90.

A polyester (B) was obtained in the same way as in the polymerization of the polyester (A) except for using 80 parts of dimethyl terephthalate and 20 parts of dimethyl isophthalate in place of 100 parts of dimethyl terephthalate.

An ester exchange reaction was carried out by using 100 parts of dimethyl terephthalate and 60 parts of ethylene glycol as the starting materials and adding 0.09 part of magnesium acetate-tetrahydrate as a catalyst. Spherical silica particles which had an average particle diameter of 1.1 μm and in which $d_{25}/d_{75}$ was 1.2 were added as an ethylene glycol slurry. Further, 0.04 part of ethyl acid phosphate and 0.04 part of antimony trioxide were added to the reaction mixture to carry out polycondensation for 4 hours, thereby obtaining a polyester (C).

A polyester (D) was produced in the same way as in the polymerization of the polyester (C) except for using 85 parts of dimethyl terephthalate and 15 parts of dimethyl isophthalate in place of 100 parts of dimethyl terephthalate.

A polyester (E) was produced in the same way as in the polymerization of the polyester (C) except for using 80 parts of dimethyl terephthalate and 20 parts of dimethyl isophthalate in place of 100 parts of dimethyl terephthalate.

A polyester (F) was produced in the same way as in the polymerization of the polyester (C) except for using 75 parts of dimethyl terephthalate and 25 parts of dimethyl isophthalate in place of 100 parts of dimethyl terephthalate.

Each the polyesters (C), (D), (E) and (F) contained 0.6 wt % of the spherical silica particles.

Production of film 50 parts of the polyester (A) and 50 parts of the polyester (E) were mixed, and the resultant mixture was extruded at 250° C. from an extruder in the form of a sheet. The sheet was rapidly cooled and hardened on a rotary cooling drum with the surface temperature set at 20° C. by an electrostatic pinning method. In this way, a substantially amorphous sheet having a thickness of 24 μm was obtained.

The amorphous sheet was then stretched in the machine direction to 4.3 times at 65° C. and in the transverse direction to 4.6 times at 70° C. The film was then heat-treated at 90° C. for 6 seconds, thereby obtaining a biaxially oriented film having a thickness of 1.5 μm. The film obtained was laminated with thin porous paper by an ordinary method so as to produce heat-sensitive stencil paper. The physical properties of the film and the printing properties at the time of mimeographing are shown in Table 1.

Example 2

A film having a thickness of 1.5 μm was produced in the same way as in Example 1 by mixing 50 parts of the polyester (B) and 50 parts of the polyester (E) . The film obtained was laminated with thin porous paper by an ordinary method so as to produce heat-sensitive stencil paper. The physical properties of the film and the printing properties at the time of mimeographing are shown in Table 1.

Example 3

A film having a thickness of 1.5 μm was produced in the same way as in Example 1 by mixing 50 parts of the polyester(A), 50 parts of the polyester (D) and 25 parts of the polyester (F). The film obtained was laminated with thin porous paper by an ordinary method so as to produce heat-sensitive stencil paper. The physical properties of the film and the printing properties at the time of mimeographing are shown in Table 1.

Comparative Example 1

A film having a thickness of 5.0 μm was produced in the same way as in Example 2. The film obtained was laminated with thin porous paper by an ordinary method so as to produce heat-sensitive stencil paper. The physical properties of the film and the printing properties at the time of mimeographing are shown in Table 1.

Comparative Example 2

A film having a thickness of 1.5 μm was produced by mixing the polyester (A) and the polyester (C) in the same way as in Example 1 except for changing the extrusion temperature to 280° C. The film obtained was laminated with thin porous paper by an ordinary method so as to produce heat-sensitive stencil paper. The physical properties of the film and the printing properties at the time of mimeographing are shown in Table 1.

TABLE 1

| | Material* | Thickness (μm) | Surface roughness (μm) Ra | Rt | Melting point (°C.) $T_M$ | $T_m$ | Practical properties 0.09 mJ/0.12 mJ Perforation sensitivity | Printing quality |
|---|---|---|---|---|---|---|---|---|
| Example 1 | A/E (50/50) | 1.5 | 0.048 | 0.68 | 222 | 216 | Δ/O | O/O |
| Example 2 | B/E (50/50) | 1.5 | 0.049 | 0.75 | 196 | 195 | O/O | O/O |
| Example 3 | A/D/F (50/25/50) | 1.5 | 0.050 | 0.73 | 225 | 220 | Δ/O | O/O |
| Comp. Example 1 | B/E (50/50) | 5.0 | 0.070 | 1.28 | 196 | 195 | X/X | X/X |
| Comp. Example 2 | A/C (50/50) | 1.5 | 0.052 | 0.62 | 235 | 209 | X/Δ | X/Δ |

*A: Butylene terephthalate 100 mol %,
B: Butylene terephthalate 80 mol % - Butylene isophthalate 20 mol %,
C: Ethylene terephthalate 100 mol %,
D: Ethylene terephthalate 85 mol % - Ethylene isophthalate 15 mol %,
E: Ethylene terephthalate 80 mol % - Ethylene isophthalate 20 mol %,
F: Ethylene terephthalate 75 mol % - Ethylene isophthalate 25 mol %.

Each of the films in Examples 1 to 3 was excellent in the handling property at the time of the production of the film and at the time of the production of the stencil paper. The stencil paper formed therefrom was excellent in the perforation sensitivity, so that a good mimeographing property was exhibited.

In contrast, since the film in Comparative Example 1 had too large thickness and the difference in $T_M$ and $T_m$ in the film in Comparative Example 2 was more than 10° C., each of the perforation sensitivity of the stencil paper formed therefrom was inferior.

Examples 4 to 9

Production of polyester-1

80 parts of dimethyl terephthalate, 20 parts of dimethyl isophthalate and 60 parts of ethylene glycol as the starting materials and 0.09 part of magnesium acetatetetrahydrate as a catalyst were charged into a reactor. The initial reaction temperature was 150° C. and the temperature was gradually raised while distilling off methanol. The reaction temperature was raised to 230° C. in about 3 hours. 4 hours after the start of the reaction, the ester exchange reaction was substantially finished. 10 parts of an ethylene glycol slurry containing 0.6 part of organic particles (crosslinked polymer particles) which had an average particle diameter of 0.35 μm and in which $d_{25}/d_{75}$ was 1.4 was added to the reaction mixture. Further, 0.04 part of ethyl acid phosphate and 0.04 part of antimony trioxide were added to the reaction mixture to carry out polycondensation for 4 hours.

As the temperature was gradually raised from 230° C. to 280° C., the pressure was gradually reduced from the normal pressure to 0.3 mmHg. 4 hours after the start of the reaction, the reaction was stopped and the polymer was drawn out under pressurization with nitrogen. The intrinsic viscosity of the polyester obtained was 0.72. This polyester is referred to as a polyester G. A polyester K was produced in the same manner. The composition of thereof is shown in Table 2.

Production of polyester-2

100 parts of dimethyl terephthalate, 56 parts of 1,4-butanediol and 0.005 part of tetrabutyl titanate were charged into a reactor. The initial reaction temperature was 150° C. and the temperature was gradually raised while distilling off methanol. The reaction temperature was raised to 210° C. in about 3 hours. 4 hours after the start of the reaction, the ester exchange reaction was substantially finished. 10 parts of an 1,4-butanediol slurry containing 0.1 part of spherical silica particles which had an average particle diameter of 1.0 μm and in which $d_{25}/d_{75}$ was 1. 2 was added to the reaction mixture. Further, 0.005 part of tetrabutyl titanate was added as a polymerization catalyst and polycondensation was carried out by an ordinary method.

As the temperature was gradually raised from 210° C. to 260° C., the pressure was gradually reduced from the normal pressure to 0.3 mmHg. 4 hours after the start of the reaction, the reaction was stopped and the polymer was drawn out under pressurization with nitrogen. The intrinsic viscosity of the polyester obtained was 0.90. This polyester is referred to as a polyester H. Polyesters I, J, L and M were produced in the same manner. The compositions thereof are shown in Table 2.

TABLE 2

| Polyester | Polyester composition (mol %) DMT | DMI | EG | 1,4-BD | Particles: Kind | Mohs hardness | Particle diameter (μm) | $d_{25}/d_{75}$ | Amount added (%) |
|---|---|---|---|---|---|---|---|---|---|
| G | 80 | 20 | 100 | — | Organic particles | — | 0.35 | 1.4 | 0.6 |
| H | 100 | — | — | 100 | Spherical silica | 5.5 | 1.00 | 1.2 | 0.1 |
| I | 100 | — | — | 100 | Celite | 6 | 1.20 | 1.4 | 0.1 |
| J | 100 | — | — | 100 | Alumina | 9 | 0.95 | 1.4 | 0.1 |
| K | 90 | 10 | 100 | — | Organic particles | — | 0.95 | 1.4 | 0.6 |
| L | 70 | 30 | — | 100 | Spherical silica | 5.5 | 1.00 | 1.2 | 0.1 |
| | | | | | Organic particles | — | 0.35 | 1.4 | 0.6 |
| M | 100 | — | 70 | 30 | Spherical silica | 5.5 | 1.00 | 1.2 | 0.1 |
| | | | | | Organic particles | — | 0.35 | 1.4 | 0.6 |

Production of film

Each of the polyesters shown in Table 3 was extruded at 280° C. from an extruder in the form of a sheet. The sheet was rapidly cooled and hardened on a rotary cooling drum with the surface temperature set at 30° C. by an electrostatic pinning method. In this way, a substantially amorphous sheet having a thickness of 32 μm was obtained.

The amorphous sheet was then stretched in the machine direction to 4.5 times at 65° C. and in the transverse direction to 4.3 times at 70° C. The film was then heat-treated at 90° C. for 6 seconds, thereby obtaining a biaxially oriented film having a thickness of 1.5 μm.

The film obtained was laminated with thin porous paper by an ordinary method so as to produce stencil paper. The physical properties of the film and the printing properties at the time of mimeographing are shown in Tables 3 and 4

TABLE 3

| | Polyester (wt %) | Wind-up property |
|---|---|---|
| Example 4 | G(50) H(50) | O |
| Example 5 | G(50) I(50) | O |
| Example 6 | G(50) J(50) | O |
| Example 7 | K(50) H(50) | O |
| Example 8 | L(100) | O |
| Example 9 | M(100) | O |

TABLE 4

| | Material* polyester | Thickness (μm) | Surface roughness (μm) Ra | Rt | Melting point (°C.) $T_M$ | $T_m$ | Practical properties 0.09 mJ/0.12 mJ Perforation sensitivity | Printing quality |
|---|---|---|---|---|---|---|---|---|
| Example 4 | G/H (50/50) | 1.5 | 0.033 | 0.53 | 220 | 215 | O/O | O/O |
| Example 5 | G/I (50/50) | 1.5 | 0.038 | 0.68 | 222 | 216 | O/O | O/O |
| Example 6 | G/J (50/50) | 1.5 | 0.032 | 0.58 | 220 | 216 | O/O | O/O |
| Example 7 | K/H (50/50) | 1.5 | 0.035 | 0.52 | 225 | 218 | O/O | O/O |
| Example 8 | L (100) | 1.5 | 0.045 | 0.73 | 170 | 170 | O/O | O/O |
| Example 9 | M (100) | 1.5 | 0.048 | 0.70 | 200 | 200 | O/O | O/O |

As described above, the film for heat-sensitive stencil paper according to the present invention has a good handing property and an excellent perforation property, and the printed image produced by stencil paper using this film has a high resolution and an excellent printing quality. Thus, the film of the present invention has a high industrial value.

What is claimed is:

1. A film for heat-sensitive stencil paper comprising a biaxially oriented film having a thickness of 0.5 to 6.0 μm and formed from a polyester composition comprising polybutylene terephthalate and at least one other polyester, the content of the polybutylene terephthalate in the polyester composition being 20 to 80 wt % and wherein the polyester composition has one melting point or a plurality of melting points with a difference of less than 10° C. between the highest melting point and the lowest melting point.

2. A film for heat-sensitive stencil paper according to claim 1, wherein the melting point of the polyester composition is in the range of 150° to 240° C.

3. A film for heat-sensitive stencil paper according to claim 1, wherein the polyester composition contains (A) 0.005 to 0.3 wt % of particles which have an average particle diameter ($d_1$) of 0.6 to 3.0 μm and a Mohs hardness of not less than 5; and (B) 0.05 to 3 wt % of particles which have an average particle diameter ($d_2$) of 0.06 to 0.8 μm, wherein $d_1/d_2$ is 2 to 10.

4. A film for heat-sensitive stencil paper according to claim 2, wherein the polyester composition contains (A) 0.005 to 0.3 wt % of particles which have an average particle diameter ($d_1$) of 0.6 to 3.0 μm and a Mohs hardness of not less than 5; and (B) 0.05 to 3 wt % of particles which have an average particle diameter ($d_2$) of 0.06 to 0.8 μm and in which $d_1/d_2$ is 2 to 10.

5. A film for heat-sensitive stencil paper according to claim 1, wherein the center-line average surface roughness (Ra) of the film is from 0.01 to 0.4 μm.

6. A film for heat-sensitive stencil paper according to claim 1, wherein the intrinsic viscosity of the polyester composition is from 0.6 to 1.2.

7. A film for heat-sensitive stencil paper according to claim 1, wherein said content of the polybutylene terephthalate in the polyester composition is from 40 to 70 wt %.

8. A film for heat-sensitive stencil paper according to claim 1, wherein the thickness of said film is from 0.5 to 2.0 μm.

9. A film for heat-sensitive stencil paper according to claim 2, wherein said melting point is in the range of 160° to 230° C.

10. A film for heat-sensitive stencil paper according to claim 6, wherein said intrinsic viscosity is from 0.7 to 1.0.

11. A film for heat-sensitive stencil paper according to claim 1, wherein the heat shrinkage of the film when treated at 100° C. for 3 minutes is not less than 20%.

12. A film for heat-sensitive stencil paper according to claim 1, wherein one of said at least one other polyester comprises polyethylene terephthalate isophthalate.

13. A film for heat-sensitive stencil paper according to claim 3, wherein said Mohs hardness of the particles (A) is not less than 5.5.

14. A film for heat-sensitive stencil paper according to claim 3, wherein said average particle diameter ($d_1$) of the particles (A) is from 0.8 to 2.0 μm.

15. A film for heat-sensitive stencil paper according to claim 3, wherein said average particle diameter ($d_2$) of the particles (B) is from 0.1 to 0.6 μm.

16. A film for heat-sensitive stencil paper according to claim 3, wherein be content of the particles (A) is from 0.01 to 0.2 wt %.

17. A film for heat-sensitive stencil paper according to claim 3, wherein the content of the particles (B) is from 0.1 to 2 wt %.

18. A film for heat-sensitive stencil paper according to claim 3, wherein the particle size distribution ($d_{25}/d_{75}$) of both particles (A) and particles (B) is from 1.0 to 1.5.

19. A film for heat-sensitive stencil paper according to claim 1, wherein the maximum height ($R_t$) of the film surface is from 0.4 to 2 μm.

20. Heat-sensitive stencil paper comprising the film of claim 1.

* * * * *